(12) United States Patent
Parks et al.

(10) Patent No.: US 8,386,563 B2
(45) Date of Patent: *Feb. 26, 2013

(54) ZERO-CLICK SHARING OF APPLICATION CONTEXT ACROSS DEVICES

(75) Inventors: Jason Parks, Austin, TX (US); Nicholas Julian Pelly, San Francisco, CA (US); Jeffrey William Hamilton, Austin, TX (US); Robert William Hamilton, London (GB); Maarten W. Hooft, Menlo Park, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/549,364

(22) Filed: Jul. 13, 2012

(65) Prior Publication Data

US 2012/0290669 A1 Nov. 15, 2012

Related U.S. Application Data

(63) Continuation of application No. 13/247,781, filed on Sep. 28, 2011, now Pat. No. 8,224,894.

(60) Provisional application No. 61/484,190, filed on May 9, 2011.

(51) Int. Cl.
*G06F 15/16* (2006.01)
*G06F 12/00* (2006.01)

(52) U.S. Cl. ........................................ 709/203; 709/250

(58) Field of Classification Search .................. 709/203, 709/225–229, 231, 250
See application file for complete search history.

(56) References Cited

U.S. PATENT DOCUMENTS

| | | |
|---|---|---|
| 5,301,309 A | 4/1994 | Sugano |
| 5,819,021 A | 10/1998 | Stanfill et al. |
| 6,462,767 B1 | 10/2002 | Obata et al. |
| 7,089,007 B2 | 8/2006 | Wakuta et al. |
| 7,516,891 B2 | 4/2009 | Chaum |
| 7,529,653 B2 | 5/2009 | Frankel et al. |
| 7,957,518 B2 | 6/2011 | Erb |
| 7,957,733 B2 | 6/2011 | Wang et al. |
| 7,962,142 B2 | 6/2011 | O'Neill et al. |
| 7,995,533 B1 | 8/2011 | Koodi et al. |
| 8,060,389 B2 | 11/2011 | Johnson |
| 8,214,686 B2 | 7/2012 | Ueda |
| 2002/0033981 A1 | 3/2002 | Keller et al. |
| 2003/0220937 A1 | 11/2003 | Maeoka et al. |

(Continued)

FOREIGN PATENT DOCUMENTS

| | | |
|---|---|---|
| EP | 1760584 A1 | 3/2007 |
| WO | WO 2005/076542 A1 | 8/2005 |

(Continued)

OTHER PUBLICATIONS

PCT International Search Report and Written Opinion dated Aug. 22, 2012 for corresponding PCT International Application No. PCT/US2012/036961 (12 pages).

(Continued)

*Primary Examiner* — Zarni Maung
(74) *Attorney, Agent, or Firm* — Remarck Law Group PLC

(57) ABSTRACT

A first client device performs a handoff operation to a second client device by transmitting application information, associated with a first application, to the second client device when the first client device is positioned within a predefined proximity of the second client device. The first application has a first client device user interface state when the handoff operation is performed. Further, the first client device, in response to receiving from another client device application information associated with a second application executed by the other first client device, executes a third application corresponding to the second application with an initial user interface state corresponding to a user interface state of the other client device.

21 Claims, 10 Drawing Sheets

U.S. PATENT DOCUMENTS

| | | |
|---|---|---|
| 2004/0055004 A1 | 3/2004 | Sun et al. |
| 2005/0058112 A1 | 3/2005 | Lahey et al. |
| 2005/0235029 A1 | 10/2005 | Hussman |
| 2006/0094356 A1 | 5/2006 | Dawidowsky |
| 2007/0115827 A1 | 5/2007 | Boehnke et al. |
| 2007/0136392 A1 | 6/2007 | Oh et al. |
| 2007/0160047 A1 | 7/2007 | Park et al. |
| 2007/0263828 A1 | 11/2007 | Lee et al. |
| 2007/0282990 A1 | 12/2007 | Kumar et al. |
| 2008/0278567 A1 | 11/2008 | Nakajima |
| 2008/0294937 A1 | 11/2008 | Ueda |
| 2008/0310611 A1 | 12/2008 | Moriwaki et al. |
| 2009/0003281 A1 | 1/2009 | Panabaker |
| 2009/0116445 A1 | 5/2009 | Samar et al. |
| 2009/0118018 A1 | 5/2009 | Perlman et al. |
| 2009/0157799 A1 | 6/2009 | Sukumaran et al. |
| 2009/0244015 A1 | 10/2009 | Sengupta et al. |
| 2010/0082136 A1 | 4/2010 | Rosenblatt et al. |
| 2010/0082567 A1 | 4/2010 | Rosenblatt et al. |
| 2010/0094948 A1 | 4/2010 | Ganesh et al. |
| 2010/0167809 A1 | 7/2010 | Perlman et al. |
| 2010/0178868 A1 | 7/2010 | Charrat |
| 2010/0328225 A1 | 12/2010 | Black |
| 2010/0332635 A1 | 12/2010 | Rogel et al. |
| 2011/0065384 A1 | 3/2011 | Cader et al. |
| 2011/0074703 A1 | 3/2011 | Black |
| 2011/0078245 A1 | 3/2011 | Kiffer |
| 2011/0205944 A1 | 8/2011 | Miyabayashi et al. |
| 2011/0223937 A1 | 9/2011 | Leppanen et al. |
| 2012/0079126 A1 | 3/2012 | Evans et al. |
| 2012/0142433 A1 | 6/2012 | Perlman et al. |
| 2012/0143944 A1 | 6/2012 | Reeves et al. |
| 2012/0149476 A1 | 6/2012 | Perlman et al. |

FOREIGN PATENT DOCUMENTS

| | | |
|---|---|---|
| WO | WO 2005/109829 A1 | 11/2005 |
| WO | WO 2010/110788 A1 | 9/2010 |

OTHER PUBLICATIONS

UK Search Report dated Aug. 13, 2012 for GB Application No. 1208206.1 (5 pages).

Nickelsen, A. et al., "Service migration protocol for NFC links," Proceedings of the 16th EUNICE/IFIP WG 6.6 Conference on Networked Services, Jun. 28-30, 2010, pp. 41-50.

NonFinal Office Action dated Sep. 17, 2012 for U.S. Appl. No. 13/461,647 (7 pages).

NonFinal Office Action dated Dec. 8, 2011 for U.S. Appl. No. 13/247,725 (10 pages).

Final Office Action dated Aug. 10, 2012 for U.S. Appl. No. 13/247,725 (14 pages).

UK Search Report dated Aug. 13, 2012 for GB Application No. 1208207.9 (3 pages).

Google, Extended European Search Report, EP 12167367.7, Jul. 27, 2012, 8 pgs.

Google, Extended European Search Report, EP 12167369.3, Jul. 27, 2012, 9 pgs.

Google, ISR/WO, PCT/US2012/036952, Jul. 30, 2012, 13 pgs.

Google, ISR/WO, PCT/US2012/036957, Jul. 30, 2012, 13 pgs.

ZERO-CLICK SHARING OF APPLICATION CONTEXT ACROSS DEVICES

RELATED APPLICATIONS

This application is a continuation of U.S. application Ser. No. 13/247,781, filed Sep. 28, 2011, now U.S. Pat. No. 8,224,894, which claims priority to U.S. provisional patent application No. 61/484,190, filed May 9, 2011, which applications are incorporated by reference herein in their entirety.

TECHNICAL FIELD

The disclosed embodiments relate generally to wireless communication and more particularly to transferring use of one or more applications between two devices through wireless communication connections.

BACKGROUND

A user with multiple devices, such as one or more smart phones, tablets, laptop computers or the like, may want to switch from using one device to another while continuing to work with or access the same application or content. For example, the user may want to transfer from one device to another in order to use the device best suited for a given task. For example, it is easy to read email from a smart phone but difficult to reply due to the size limitations on the phone keyboard. A user may start a draft of a message on a phone, but prefer to finish the draft using a tablet, which has a larger keyboard. In another example, a user starts playback of a video using a tablet or smart phone, but would prefer to continuing viewing the video on a device with a larger screen such as a television or laptop computer. In yet another example, a user may start a phone call using a landline telephone but want to continue the phone call using a mobile phone using a cellular connection, or vice versa.

SUMMARY

In some embodiments, a first client device performs a handoff operation to a second client device by transmitting application information, associated with a first application, to the second client device when the first client device is positioned within a predefined proximity of the second client device. The first application has a first client device user interface state when the handoff operation is performed. Further, the first client device, in response to receiving from another client device application information associated with a second application executed by the other first client device, executes a third application corresponding to the second application with an initial user interface state corresponding to a user interface state of the other client device.

In some implementations, executing the third application, in response to receiving the application information associated with a second application, includes transitioning from a system state in which the third application corresponding to the second application is not executing as a foreground application to a system state in which the third application corresponding to the second application is executing as the foreground application.

In some implementations, the predefined proximity is no greater than four centimeters.

In some implementations, the second application and third application are both email applications. In some such implementations, when the user interface state of the other client device displays a particular message or conversation thread, the initial user interface state corresponding to the user interface state of the other client device or system displays said particular message or conversation thread. In some implementations, when the user interface state of the other client device displays an unsent draft message, the initial user interface state corresponding to the user interface state of the other client device comprises display of said unsent draft message. Furthermore, in some implementations, when the user interface state of the other client device displays a first list of conversations corresponding to a user-specified search query, the initial user interface state corresponding to the device user interface state of the other client device displays a second list of conversations corresponding to the user-specified search query.

BRIEF DESCRIPTION OF THE DRAWINGS

For a better understanding of the disclosed embodiments, reference should be made to the Description of Embodiments below, in conjunction with the following drawings in which like reference numerals refer to corresponding parts throughout the figures.

DESCRIPTION OF EMBODIMENTS

It will be understood that, although the terms "first," "second," etc. may be used herein to describe various elements, these elements should not be limited by these terms. These terms are only used to distinguish one element from another. For example, a first application could be termed a second application, and, similarly, a second application could be termed a first application, without changing the meaning of the description, so long as all occurrences of the "first application" are renamed consistently and all occurrences of the second application are renamed consistently. The first application and the second application are both application, but they are not the same application.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the described embodiments. However, some embodiments may be practiced without these specific details. In other instances, well-known methods, procedures, components, and circuits have not been described in detail so as not to unnecessarily obscure aspects of the embodiments.

Figure 1:
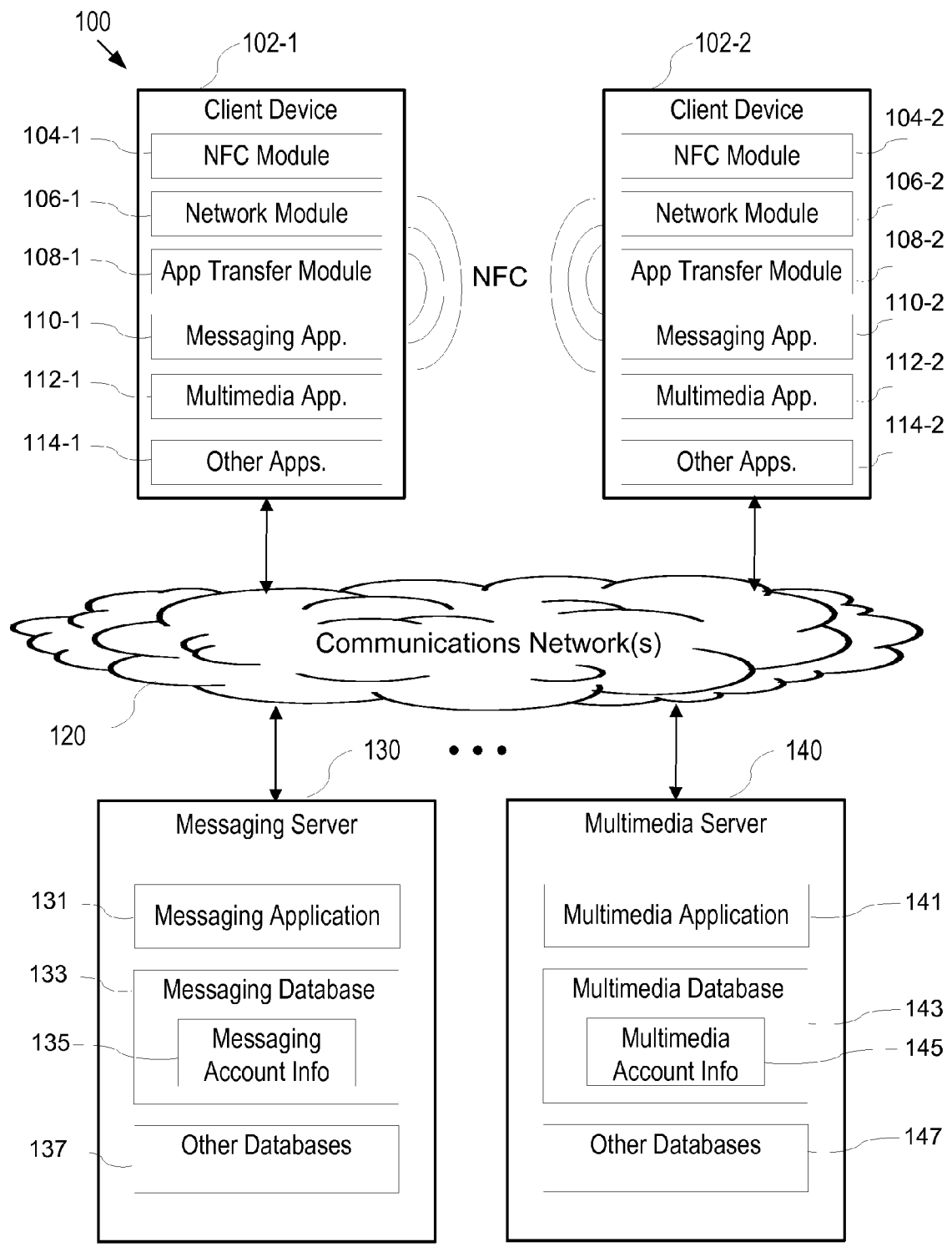
FIG. 1 is a block diagram of a system for enabling transferring application state across devices according to one embodiment.

FIG. 1 is a block diagram illustrating a distributed system 100 having two or more client devices or systems 102 (hereinafter called clients 102). The distributed system 100 typically further includes one or more communication networks 120 and a plurality of application servers or server systems such as one or more messaging servers 130 and one or more multimedia servers 140.

In some embodiments, each of the clients 102-1 and 102-2 has a near field communication (NFC) module 104 for handling NFC communications, a network module 106 for handling network communications, an application transfer module 108 discussed in more detail below, and one or more application programs 110, 112, 114. NFC modules 104-1 and 104-2 enable NFC communication between NFC-enabled devices. In some embodiments, the applications on a client 102 include one or more messaging applications 110, one or more multimedia applications 112 and optionally other applications 114 as well. As described in more detail below, in some implementations, when a user brings two clients 102 into close proximity (e.g., within NFC communication distance of each other, which typically means within 10 cm of each other, but optionally means within 5 cm or 4 cm), the application state of one or more applications (e.g., the active or foreground application) on one of the clients (e.g., client 102-1) is transferred to the other client (e.g., client 102-2).

Messaging server 130 includes one or more messaging server applications 131, a messaging database 133 that stores messaging account information 135 for multiple users of a messaging service supported by server 130, and optionally other databases 137 as well. For example, messaging server 130 may be a Gmail server, an email server other than a Gmail server, or an instant messaging server. Multimedia server 140 includes one or more multimedia server applications 141, one or more multimedia databases 143, including multimedia account information 145, and optionally other databases 147 as well. Examples of multimedia server 140 include a YouTube server, online radio servers, and social gaming servers.

In some implements, a user reading an email message using a client-side messaging application 110-1 (e.g., Gmail) on his mobile cell phone (client 102-1) may instead want to reply to the message on a nearby desktop computer (client 102-2) that has a larger keyboard and a bigger display screen. To do this, the user brings his mobile cell phone 102-1 into close proximity with computer 102-2. Both clients 102 have NFC modules 104. NFC module 104-1 in client 102-1 detects the presence of computer 104-2, and a NFC communication connection is established between mobile phone 102-1 and computer 102-2. The current state of messaging application 110-1, in this example comprising the user's account identifier (e.g., username@domainname.com) and message identifier is transmitted over the NFC connection to computer 102-2. Optionally, messaging application 110-1 in client 102-1 also communicates with messaging server 130 over communications networks 120 to ensure that server 130 has the most recent status with respect to the message currently displayed by client 102-1. Computer 102-2 receives the current state of messaging application 102-1 from the phone 102-1, and in response, messaging application 110-2 in computer 102-2 downloads a copy of the email message from messaging server 130 via communication networks 120. From the user's point of view, as soon as he sits down in front of the display of computer 102-2, the same email message he was reading on phone 102-1 is now displayed on the display screen of computer 102-2 and he can start typing his reply using the keyboard of computer 102-2.

Figure 2:
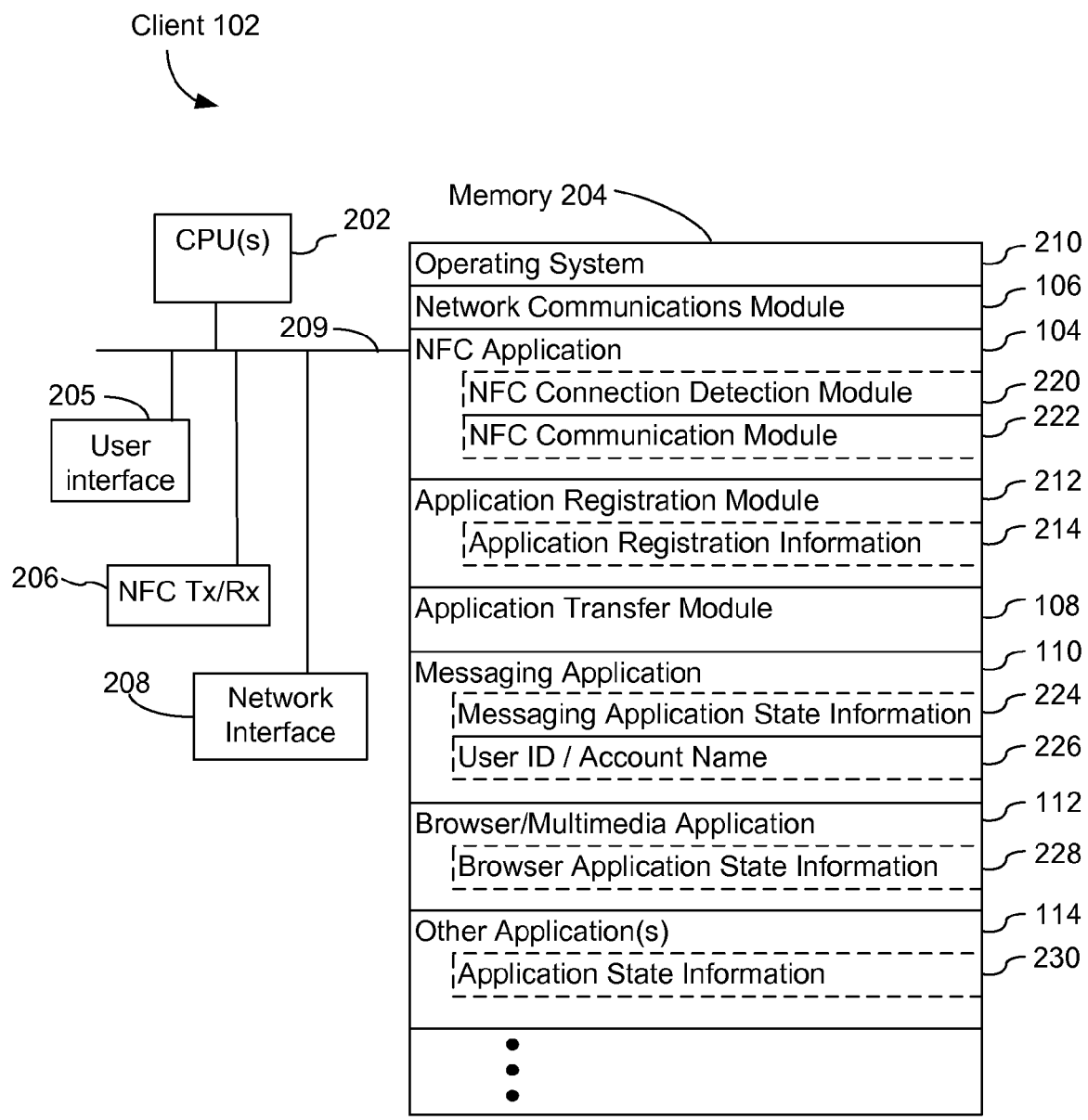
FIG. 2 is a block diagram illustrating of a client device or system, in accordance with some embodiments.

FIG. 2 is a block diagram illustrating a client device or system (client) 102 in accordance with some embodiments. Client 102 typically includes one or more processors 202 (also called processing units or CPU(s)), memory 204, a near field communication (NFC) transceiver (transmitter and receiver) 206, one or more network or other communication interfaces 208, a user interface 205 (typically including comprising a display device and a keyboard, mouse, touchpad, touchscreen or other input device), and one or more communication buses 209 for interconnecting these components. The communication buses 209 optionally include circuitry (sometimes called a chipset) that interconnects and controls communications between system components. Memory 204 typically includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 204 optionally includes one or more storage devices remotely located from the CPU(s) 202. Memory 204, or alternatively the non-volatile memory device(s) within memory 203, comprises a non-transitory computer readable storage medium. In some embodiments, memory 204 or alternatively the non-transitory computer readable storage medium stores the following programs and/or modules for execution by the one or more processors 202 and data structures, or a subset thereof:

- an Operating System 210 that includes procedures for handling various basic system services and for performing hardware dependent tasks;
- a network communications module (or instructions) 106 that is used for connecting client 102 to other computers (e.g., messaging server 130 or multimedia server 140) via one or more network interfaces 208 (wired or wireless) and one or more communication networks 120 (FIG. 1), such as the Internet, other wide area networks, local area networks, metropolitan area networks, and so on;
- a near field communications module 104 for connecting client 102 to other clients, devices or systems via NFC transceiver 206, using near field communications;

an application registration module 212, which maintains application registration information 214 for one or more applications that are registered for sharing their application state with other client devices or systems information; for example, application registration information 214 may include information for a messaging application 110 that is registered to share its application state with another device (e.g., client 102-2) upon detection of a triggering condition;

an application transfer module 108, for transferring the application state of one or more applications (e.g., applications registered with application registration module 212 to share application state) to another device (e.g., client 102-2) upon detection of a triggering condition; and one or more applications 110, 112, 114, such as a messaging application 1120, browser or multimedia application 112, and optionally one or more other applications 114.

In some implementations, near field communications module 104 includes an NFC detection module 220 and an NFC communication module 222. NFC detection module 220 detects the presence of another NFC-enabled device or system within a predefined proximity and notifies client 102 upon detecting the presence of another NFC-enabled device or system within the predefined proximity. The predefined proximity is typically the proximity required to successfully establish an NFC communication channel (also called an NFC connection) between two devices, or to successfully conduct NFC communications. While environmental conditions can affect the ability to form an NFC connection, the predefined proximity is typically no greater than 10 cm, and in some implementations requires the two devices to be within 5 cm or 4 cm of each other. NFC communication module 222 handles communications between client 102 and other device via NFC transceiver 206, such as the transmission or receipt of application state, or application state information, for one or more applications.

In some implementations, application registration information 214 includes, for each registered application one or more of: an application program identifier, a mime type, and information (e.g., a procedure name, reference to an API, or the like) that enables application transfer application to obtain the application state of the registered application. Optionally, application registration information 214 is maintained by client 102 as a searchable database, table or list.

In some implementations, a respective application program stores its own application state information during execution, and thus the application state is updated from time to time. Depending on the type of the applications running, the information type and the size of the application state (e.g., the amount of memory required to store the application state) may be different from one application to another, and may be stored either locally (i.e., on client 102) or remotely, such as on a remotely located server.

In some embodiments, messaging application 110 locally stores messaging application state information 224, as well as a user identifier or account name 226. The user identifier or account name 226 indicates the user or account for which messages or other information is being displayed by messaging application 110. Depending on the current application context of messaging application 110, messaging application state information 224 includes at least one of: the identifier of a message and the format of the message currently viewed or worked on by the user, information identifying a list of messages currently displayed by client 102, information identifying a list of conversations (sometimes called message threads) currently displayed by client 102, information identifying a contact for which contract information is currently displayed by client, etc. Messaging application state information 248 may be saved either locally at client 102, or remotely on a messaging server.

In some embodiments, browser or multimedia application 112 locally stores browser application state information 228. In some implementations, browser application state information 228 is or includes the URL of a document currently being viewed, and is saved locally at client 102. Optionally, browser application state information 228 is or includes additional information, such as one or more of: document position, playback position, user entered content or modifications to the displayed document, etc.

Optionally, other applications 114, if provided, store application state information 230 of various types, depending on the type of application.

Each of the above-identified modules, applications or programs corresponds to a set of instructions, executable by the one or more processors of client 102, for performing a function described above. The above identified modules, applications or programs (i.e., sets of instructions) need not be implemented as separate software programs, procedures or modules, and thus various subsets of these modules may be combined or otherwise re-arranged in various embodiments. In some embodiments, memory 203 optionally stores a subset of the modules and data structures identified above. Furthermore, memory 203 may stores additional modules and data structures not described above.

Figure 3A:
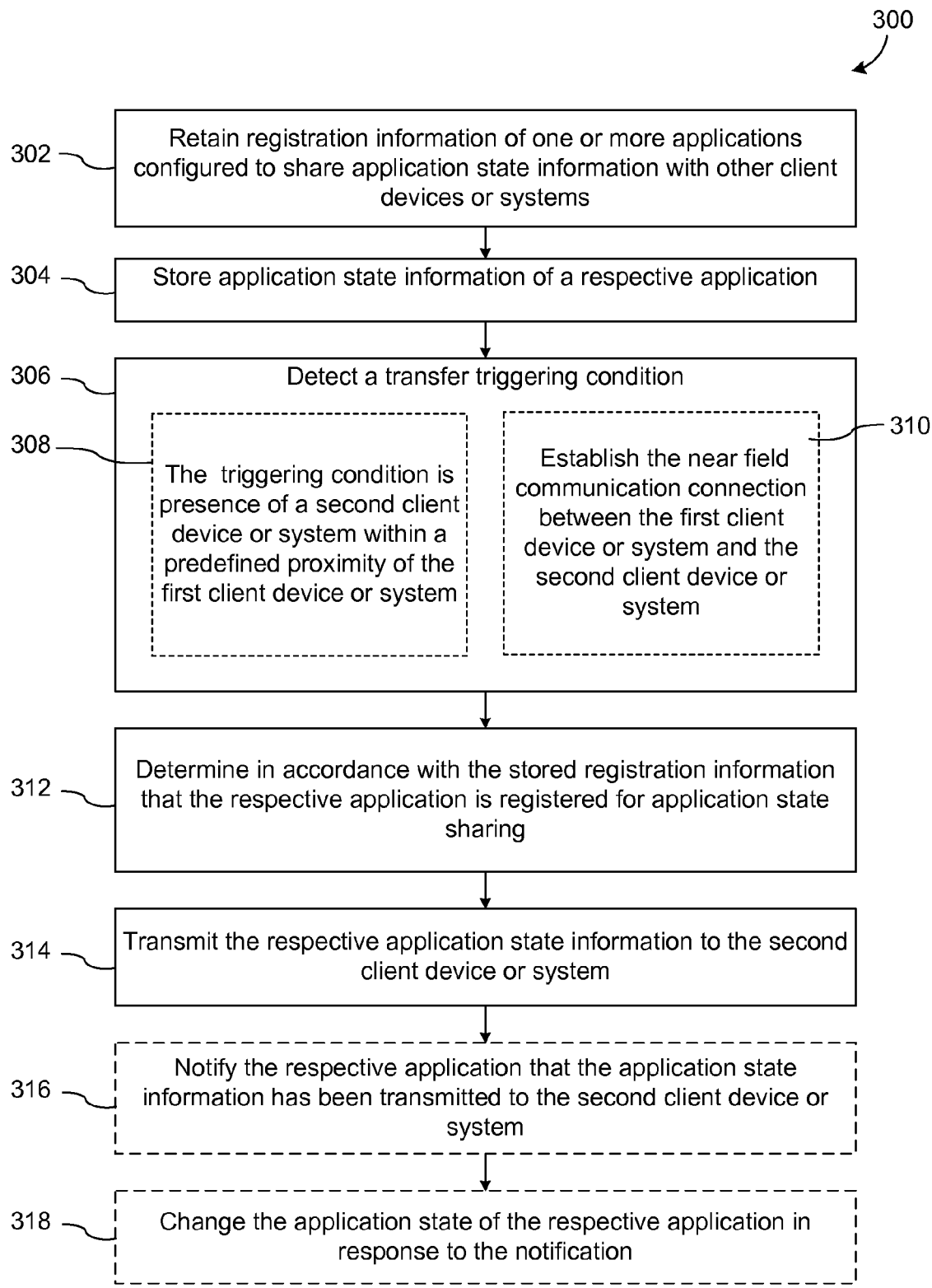
FIGS. 3A-3C include a flow chart illustrating a method of operation of a client device or system, for transmitting the application state of a respective application to another client device or system, in accordance with some embodiments.
Figure 3B:
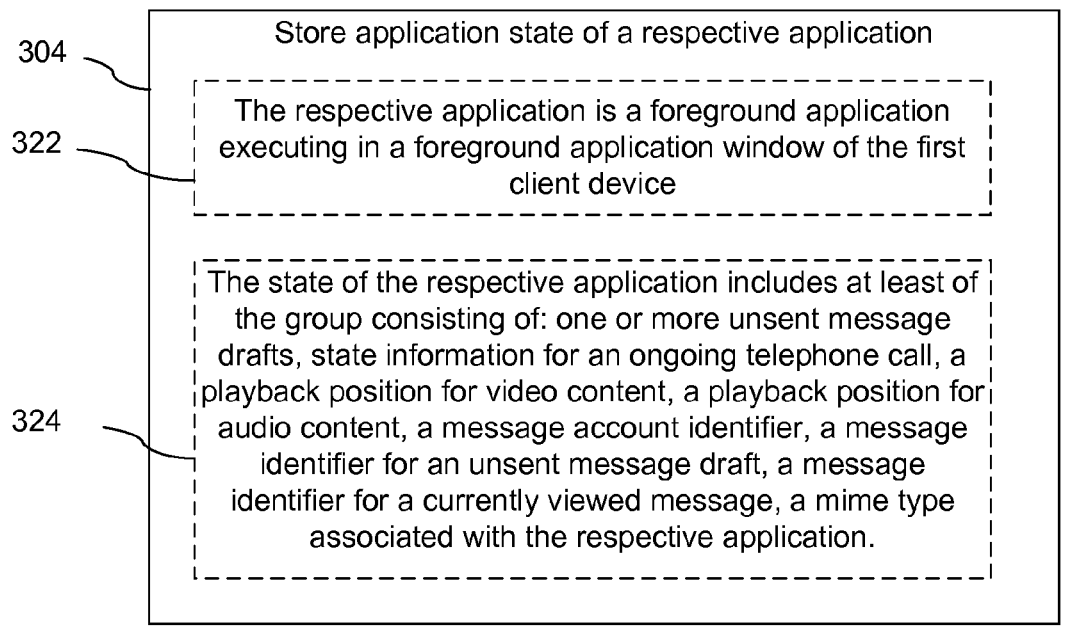
Figure 3C:
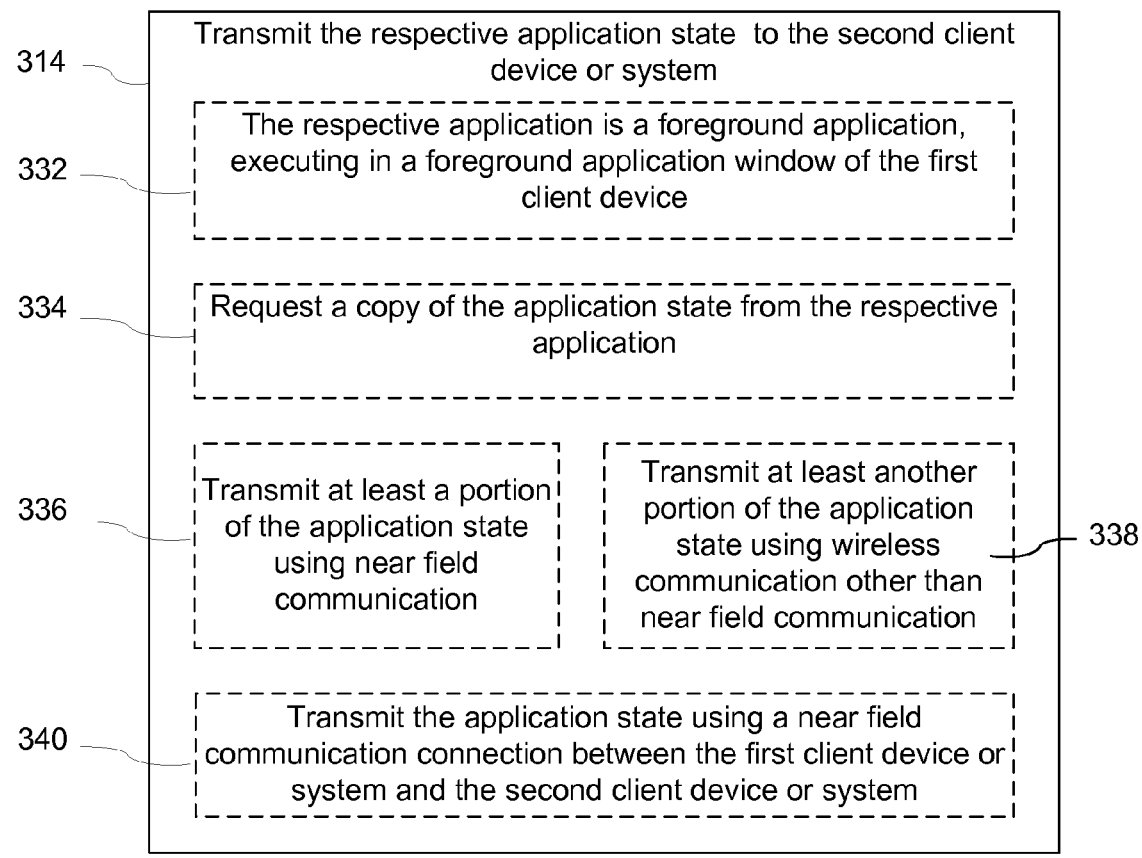

FIGS. 3A-3C include a flow chart illustrating a method 300 of operation of a client device or system (hereinafter called a client, for ease for reference) according to some embodiments. Method 300 is performed by a first client, such as client 102-1 described above with reference to FIGS. 1 and 2. Registration information (e.g., 214, FIG. 2) for a respective application (e.g., messaging application 110, browser/multimedia application 112) indicating that the respective application is registered for sharing application state (e.g., messaging application state 224 or browser application state 228) with other devices is retained in memory (302). The application state of the respective application is stored either in memory of client 102 or in memory of a server at a remote location from the client (304). During execution of the respective application, the application state is dynamically updated and stored in memory, as needed.

A transfer triggering condition for transferring application state of the respective application to another device client (e.g., from first client 102-1 to second client 102-2, FIG. 1) is detected (306). The triggering condition is presence of another device (e.g., second client 102-2) within a predefined proximity of first client 102-1 (308). This is sometimes herein called a "zero-click" triggering condition, for "zero-click" sharing. As noted above, the predefined proximity is typically the proximity required to successfully establish an NFC communication channel (also called an NFC connection) between two devices, or to successfully conduct NFC communications. In various implementations, the predefined proximity is no greater than 10 centimeters, 5 centimeters, or 4 centimeters. In some implementations, in addition to detecting the NFC field of another device, a "bump" must be detected (e.g., using one or more accelerometers in client 102-1), including that the two client devices have physically touched. In some implementations, the user need not take any action other than bringing the two devices within the predefined proximity, and hence this is sometimes called "zero-click" sharing.

In some implementations, the triggering condition further includes successfully establishing a near field communication connection between first client 102-1 and second client 102-2 (310). Optionally, first client 102-1 may need to transmit user authentication information to successfully establish the near field communication connection with second client 102-2.

Upon detecting the triggering condition, client 102-1 determines, in accordance with the stored registration information (214, FIG. 2), that a respective application (e.g., the application running in the foreground of client 102-1) is registered for application state sharing (312), and transmits the application state of the respective application to second client 102-2 (314). For ease of explaining method 300, it shall be assumed that the only application for which an application state is to be transmitted to another device is the foreground application, if any, where the foreground application is the application running in a topmost or foreground application window of first client 102-1. However, in some implementations, described in more detail below with reference to FIGS. 5A-5C, application state for more than one application is transmitted by first client 102-1 to second client 102-2.

Optionally, the respective application (at client 102-1) is notified that the application state has been transmitted to client 102-2 upon completion of the transmission (316). In some embodiments, client 102-1 may optionally change the application state of the respective application in response to the notification (e.g., at the end of the transmission of the application state) (318). For example, in the case where the respective application is a browser application, the browser application may terminate after receiving notification that the application state has been transmitted. In another example, where the respective application is an email application, after receiving notification of that the application state has been transmitted to another client, the draft message or the message being reviewed is closed, because it is assumed that the user will resume use of the email application at client 102-2. In yet another example, where the respective application is a multimedia player, playback of a video/audio by first client 102-1 is stopped after the multimedia player state is sent and notification thereof is provided to the multimedia player.

In some implementations, the respective application is a foreground application, executing in a foreground application window of client 102-1 (322, FIG. 3B; 332, FIG. 3C). Typically in client devices such as mobile phones or tablet computers, there is only one foreground application. In some implementations, the application state of the respective application includes at least one of the group consisting of: one or more unsent message drafts, state information for an ongoing telephone call, a playback position for video content, a playback position for audio content, a message account identifier, a message identifier for an unsent message draft, a message identifier for a currently viewed message, a mime type associated with the respective application (324). A playback position is typically a timestamp and/or frame number. The message identifier can be the message identifier for an unsent message draft, or for a message currently being viewed in the foreground at client 102-1. In some implementations, a copy of the application state from the respective application is requested (334) (e.g., application transfer module 108 requests the application state from a respective application, and then transfers that application state to second client 102-2).

Optionally, when the application state of the respective application is stored remotely (e.g., for an online application), a copy of the application state from the respective application is requested from a respective server and downloaded to first client 102-1, which then transfers it to second client 102-1. Alternatively, when the application state of the respective application is stored remotely (e.g., for an online application), a copy of the application state from the respective application is requested by second client 102-2 from a respective server and is downloaded directly second client 102-2.

In some embodiments, at least a portion of the application state is transmitted to second client 102-2 using near field communication (336). Furthermore, in some implementations, at least another portion of the application state is transmitted using wireless communication other than near field communication, such as Bluetooth communication or WiFi communication (338). In an exemplary implementation, in which transmitting the application state would exceed a threshold amount of time (e.g., 0.5 seconds), a portion of the application state is transferred by NFC and a remaining portion is transferred using another wireless communication channel. In yet other implementations, the application state is entirely transmitted using a near field communication connection between the first client device or system and the second device or system (340).

Method 300 is typically governed by instructions that are stored in a non-transitory computer readable storage medium in a respective client 102-1 and that are executed by one or more processors of a respective client device or system 102. Each of the operations shown in FIGS. 3A-3C typically corresponds to computer readable instructions which are stored in a computer memory or non-transitory computer readable storage medium in a respective client 102-1 and which are executed by one or more processors of the respective client 102-1. The non-transitory computer readable storage medium includes one or more memory devices of client 102-1, as described above with respect to FIG. 2. The computer readable instructions stored on the non-transitory computer readable storage medium of client 102-1 are typically source code, assembly language code or object code.

Additionally, it should be noted that details of other processes described herein with respect to methods 400, 500 and 600 (e.g., FIGS. 4A-4C, 5A-5C and 6, respectively) are also applicable in an analogous manner to method 300 described above with respect to FIGS. 3A-3C. For example, triggering conditions, and state information transferred may have one or more of the characteristics of the various the methods described herein with reference to methods 400, 500 and 600. For brevity, these details are not repeated here.

Figure 4A:
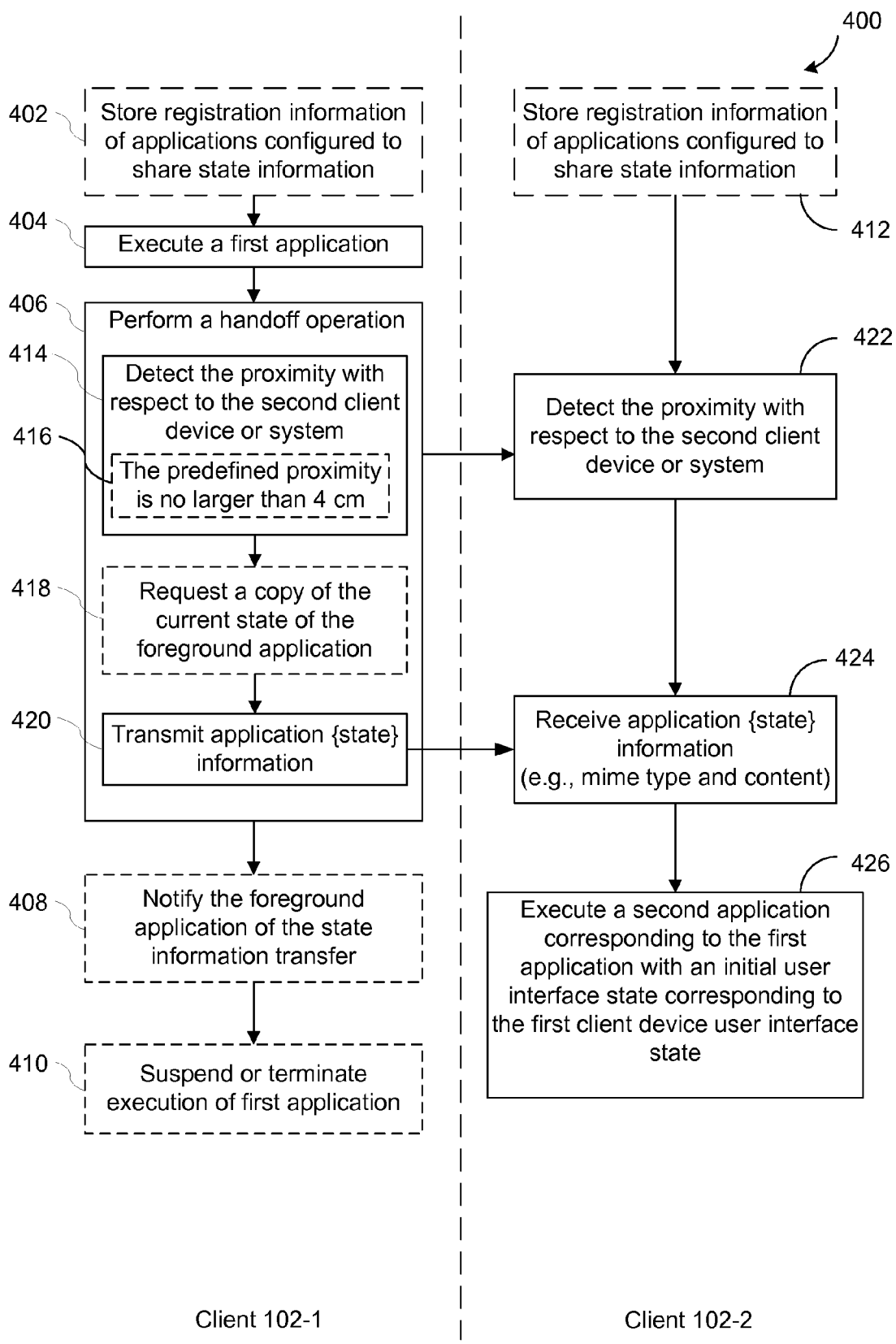
FIGS. 4A-4C include a flow chart illustrating a method of facilitating transitioning use of an application by a user from a first client device or system to a second device or system, in accordance with some embodiments.
Figure 4B:
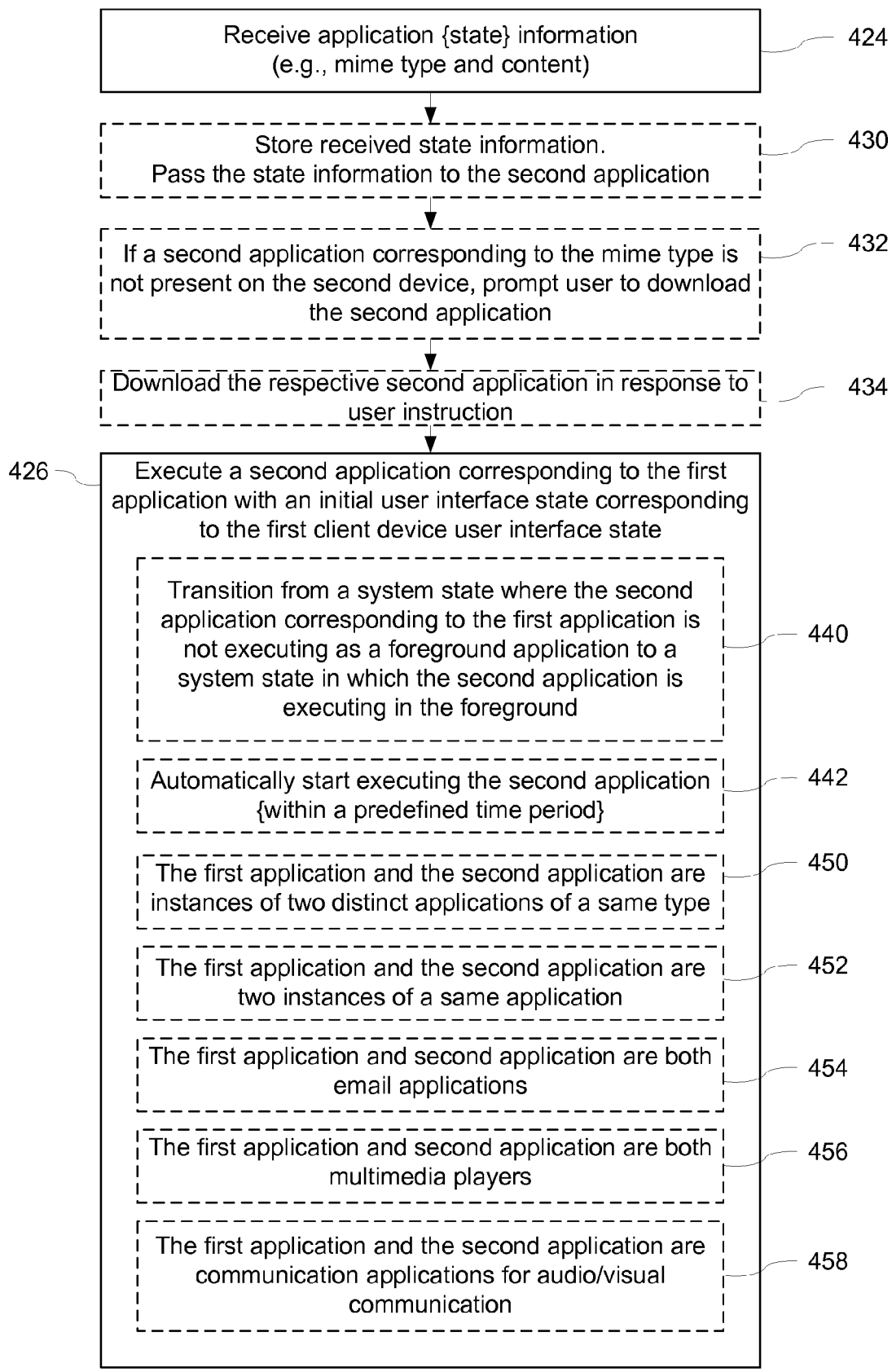
Figure 4C:
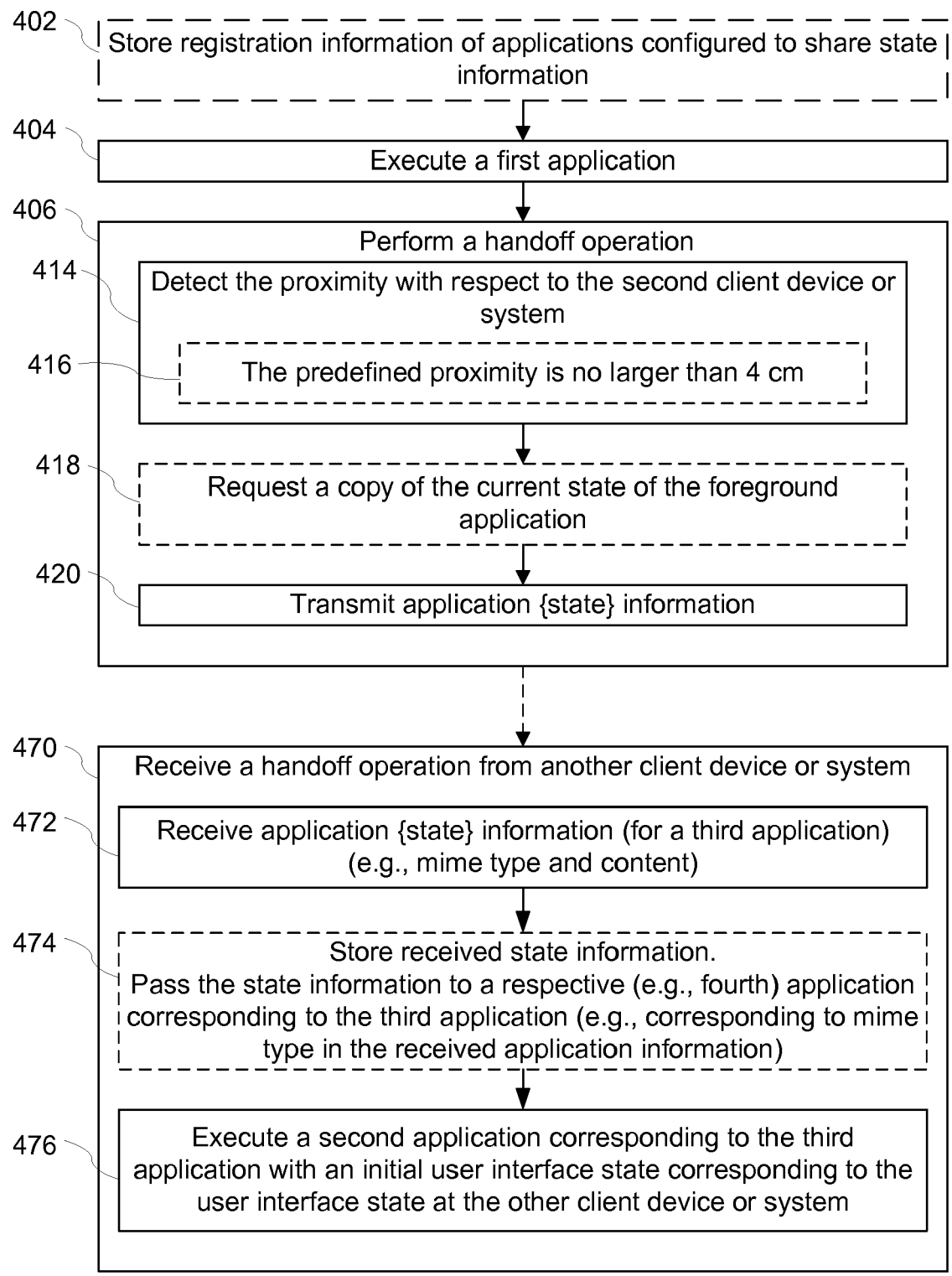

Attention is now directed to a method 400 of transitioning use of an application by a user from one client device (e.g., first client 102-1) to another (e.g., second client 102-2), as illustrated by the flow chart in FIGS. 4A-4C. At first client 102-1 which is under control of a respective user, registration information of applications registered to share application information with other devices or systems is optionally retained in memory of client first 102-1 (402). See application registration information 214, FIG. 2. A first application is actively running on first client 102-1(404). As described above, the application state of the actively running application is typically stored by first client 102-1.

While the first application is running, client 102-1 performs a handoff operation (406). In some embodiments, the handoff operation is performed by or under the control of application transfer module 108 (FIG. 2). The handoff operation begins when client 102-1 detects that it is positioned within a predefined proximity of a second device (414). Alternately stated, the handoff operation begins when client 102-1 detects proximity of the second client. In some implementations, such proximity is detected by NFC detection module 220 (FIG. 2). As described above, proximity of the second client is typically detected when the second client is within 10 cm, 5 cm or 4 cm of first client 102-1 (416).

In some implementations, as part of the handoff operation (406), client 102-1 requests from the actively running application (first application) a copy of its current application state (418). Alternatively, application transfer module 108 directly accesses state information for the actively running application. Client 102-1 transmits application information (e.g., the aforementioned state information) associated with the first application to client 102-2 (420).

At second client 102-2, registration information of applications registered to share application information with other devices or systems is optionally retained (412). Second client 102-2 also detects proximity of the first client 1021, when the two devices are within a predefined proximity (422). As part of the handoff operation described above, second client 102-2 receives the application information from client 102-1 (424). In response to receiving application information from first client 102-1, second client 102-2 executes a second application corresponding to the first application with an initial user interface state corresponding to the first client device user interface state (426). In some embodiments, second client 102-2 is under control of the same user who controls first client 102-1. Unless otherwise stated, however, the handoff operation 406 is performed whether the first and second clients are under control of the same user or not.

In some embodiments, the handoff operation occurs when the second device or system is physically touched by the first device or system. For example, an accelerometer can be used in one or both devices to detect the touch/bump, which is used to ensure that the handoff is in response to an intentional act, and thus avoid accidental handoffs.

Referring now to FIG. 4B, as noted above, second client 102-2 receives application state information from first client 102-1(424). Examples of the application state information received include the mime type of the first application and/or content of the first application. In some embodiments, client 102-2 stores the received application state information and passes the received state information to the second application (430). In some embodiments where a second application corresponding to the mime type does not exist on client 102-2, the user having control of second client 102-2 is prompted to download the second application corresponding to the first application (432). Furthermore, second client 102-2 downloads the respective second application (e.g., from a host server via communications networks 120) in response to user instruction (434). Second client 102-2 executes a second application corresponding to the first application with an initial user interface state corresponding to the first client device user interface state (426). For example, the second application is an application that can process content of the same type (e.g., MIME type) as the first application.

In some embodiments, if the second application corresponding to the first application is not already executing as a foreground application in second client 102-2, in response to receiving application information from first client 102-1, second client 102-2 executes the second application corresponding to the first application as the foreground application (440). In some embodiments where the second application is not actively running when the handoff operation is performed, second client 102-2 automatically starts executing the second application within a predefined time period (442). For example, the predefined time period is 0.5 seconds such that the starting of the second application is not noticeable to the user.

In some implementations, the first application and second application are instances of two distinct applications of a same application type (450). In other implementations, the first application and second application are two instances of a same application (452). In yet other implementations, the first application and second application are applications that both handle the same content type(s) (e.g., MIME type or types), but are optionally different types of applications (e.g., a reader/player vs. an editor).

In one example, the first application and second application are both email applications (454) (e.g., two distinct email applications, or two instances of the same email application). Note, when both applications of email applications, it is typically required that both clients 102 are under control of the same user or entity to protect the confidential information that may be contained in the email account of the user or entity.

In another example, the first application and second application are both multimedia players (456). In yet another example, the first application and second application are communication applications for audio or audio/visual communication (458).

In some embodiments for cases where the first application and second application are both email applications, the first client device user interface state comprises display of a particular message or conversation thread, and the initial user interface state corresponding to the first client device user interface state comprises display of said particular message or conversation thread. In another example, the first client device user interface state comprises display of an unsent draft message, and the initial user interface state corresponding to the first client device user interface state comprises display of said unsent draft message. In yet another example, the first client device user interface state comprises display of a first list of conversations corresponding to a user-specified search query, and the initial user interface state corresponding to the first client device user interface state comprises display of a second list of conversations corresponding to the user-specified search query. In some implementations, the first and second lists are either the same, or one is shorter than the other when one of the client devices has a smaller display than the other client device.

In some embodiments for cases where the first application and second application are both multimedia applications, the first client device user interface state comprises playback of a first multimedia item at a first playback position and the initial user interface state corresponding to the first client device user interface state comprises playback of the first multimedia item at a second playback position corresponding to the first playback position. In some embodiments, the second playback position has a predefined offset with respect to the first playback position. For example, the initial user interface state at the second client device may be earlier in the playback than the first client device user interface state by a predefined offset (e.g., 0.5 to 3.0 seconds earlier), in order to ensure that the handoff does not cause the user to miss any content.

In some embodiments, for cases where the first application and second application are both communication applications for audio or audio/visual communication, the initial user interface state of the second client corresponds to a communication connection by the second client to a same destination as a communication connection by the first client when the handoff operation is performed.

In some embodiments, the application content that is transmitted as part of the application state is selected from the group consisting of a URL, contact information for a respective address book entry, information identifying a displayed map, information identifying a displayed map and set of directions for traveling between two locations. For example, second client 102-2, in response to receiving the application state from the first client 102-1, uses the mime type included in the received application state to determine whether the second client has a second application corresponding to the first application. If it is determined that it does not have the second application with a matching mime type, second client 102-2 displays a prompt to download a respective second application corresponding to the mime type, downloads the respective second application in response to user instruction, and executes the second application.

Referring to FIG. 4C, first client 102-1 not only can hand off application information (sometimes herein called state information) for a respective application to another client (e.g., client 102-2), as represented by operation 406), but it can also receive application information from another client during a handoff operation (470). For example, after a time after the above described handoff operation 406, the user may want to transfer the state of the same application or another application back to first client 102-1. Typically, first application 102-1 will have no actively running application, or no application running in the foreground, when it receives a handoff operation. However, in other implementations, various other mechanisms may be used to determine whether first client 102-1 should accept application information from another client.

The second handoff operation, like the one described above, is typically performed in response to detecting a triggering operation. Triggering conditions are described above, and therefore that description is not repeated here. In this second handoff operation, first client 102-1 receives from another client device of system application information (e.g., state information) for a third application (472). For example, the received application information includes a mime type and application content and/or state information. Such information is described above, and thus is not repeated here. Typically, the received application information is stored by first client 102-1 and passed to a respective application (e.g., a fourth application) corresponding to the third application (474). In some implementations, the respective application to be used is determined in accordance with the mime type specified in the received application information. The respective application (e.g., fourth application) corresponding to the third application is executed by the first client device, with an initial user interface corresponding to the user interface at the other client device or system from which the application information was received (476).

Method 400 is typically be governed by instructions that are stored in a non-transitory computer readable storage medium in a respective client 102-1 and that are executed by one or more processors of a respective client device or system 102. Each of the operations shown in FIGS. 4A-4C typically corresponds to computer readable instructions which are stored in a computer memory or non-transitory computer readable storage medium in a respective client 102-1 and which are executed by one or more processors of the respective client 102-1. The non-transitory computer readable storage medium includes one or more memory devices of client 102-1, as described above with respect to FIG. 2. The computer readable instructions stored on the non-transitory computer readable storage medium of client 102-1 are typically source code, assembly language code or object code.

Additionally, it should be noted that details of other processes described herein with respect to methods 300, 500 and 600 (e.g., FIGS. 3A-3C, 5A-5C and 6, respectively) are also applicable in an analogous manner to method 400 described above with respect to FIGS. 4A-4C. For example, triggering conditions, and state information transferred may have one or more of the characteristics of the various the methods described herein with reference to methods 300, 500 and 600. For brevity, these details are not repeated here.

Figure 5A:
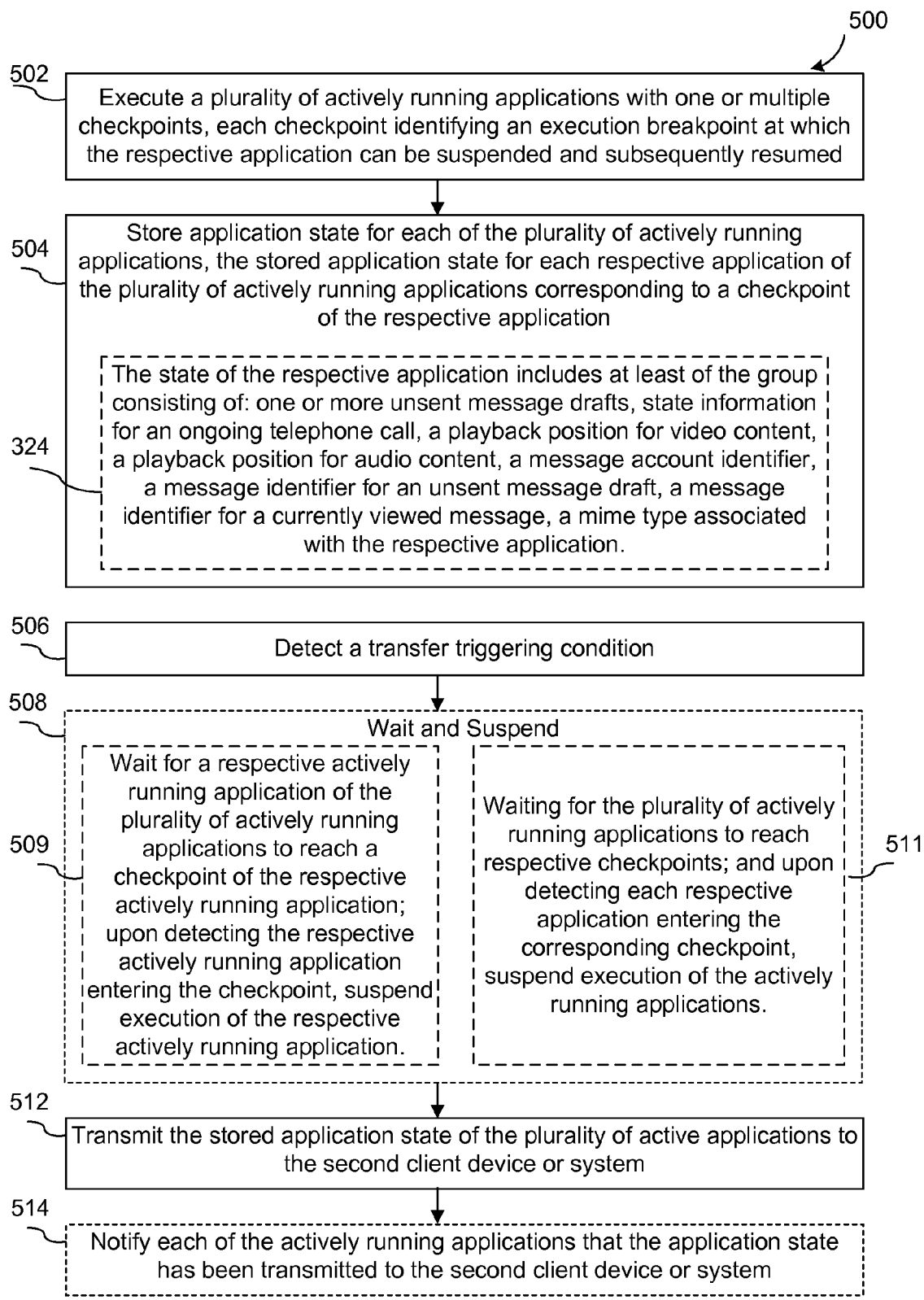
FIGS. 5A-5C include a flow chart illustrating a method of transmitting the application states of a plurality of actively running applications from a first client device or system to a second client device or system, in accordance with some embodiments.
Figure 5B:
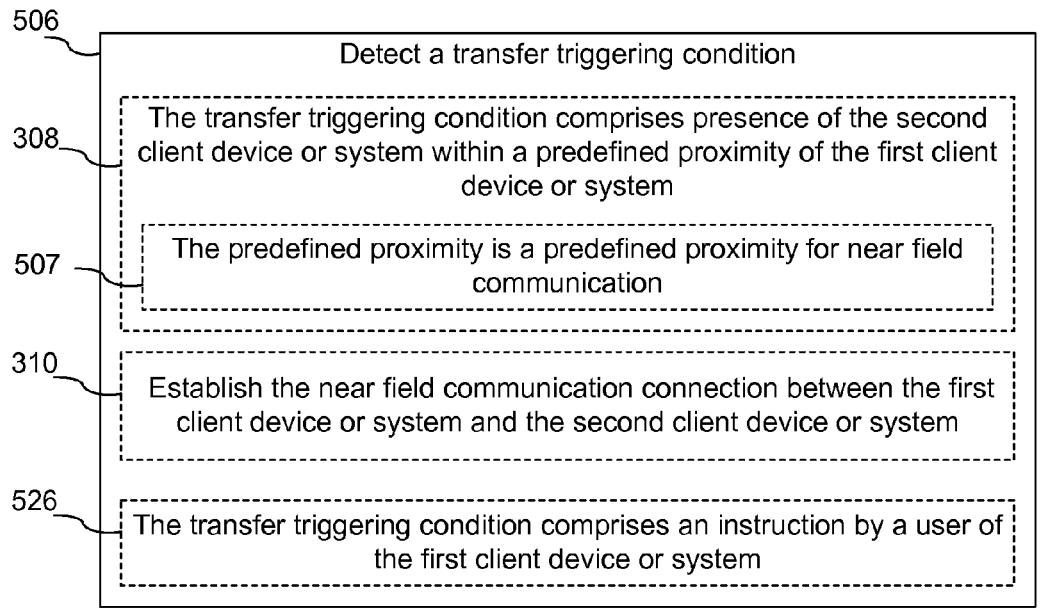
Figure 5C:
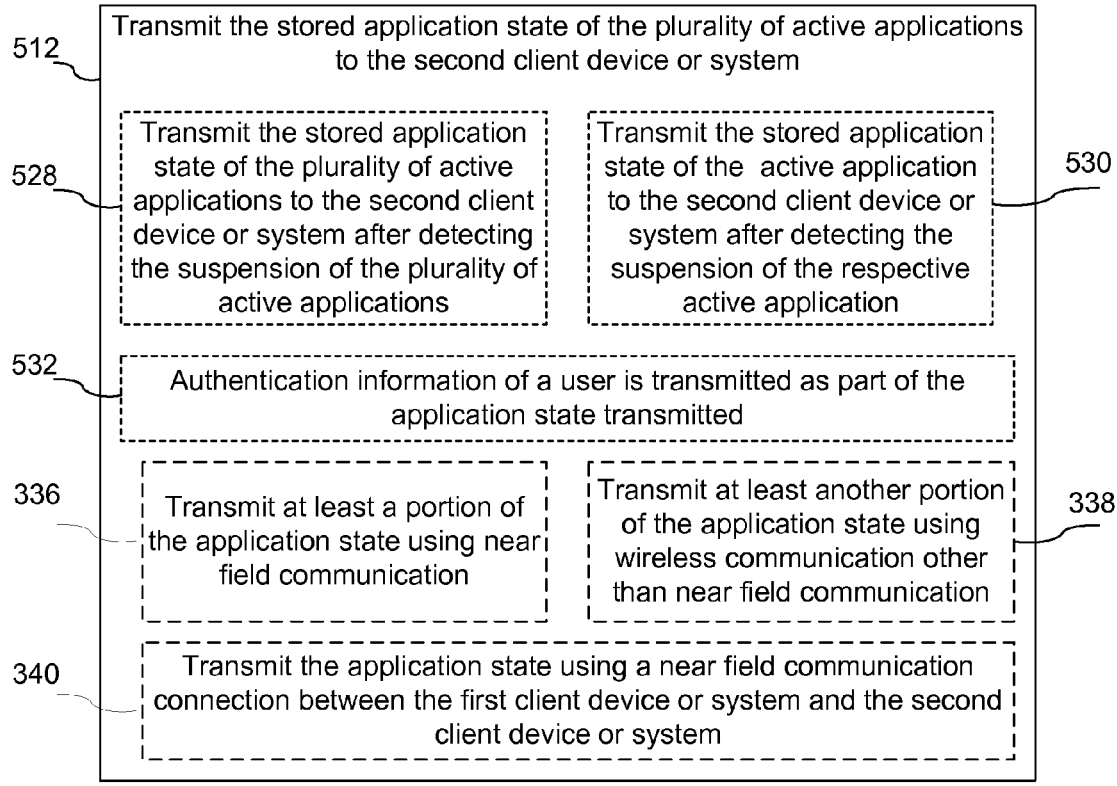

FIGS. 5A-5C include a flow chart illustrating a method 500 of operation of a client device or system (hereinafter called a client for ease for reference) according to some embodiments. Method 500 is performed by a client device or system, such as first client 102-1 described above with reference to FIGS. 1 and 2. First client 102-1 executes a plurality of actively running applications with one or multiple checkpoints, each checkpoint identifying an execution breakpoint at which the respective application can be suspended and subsequently resumed (502). The application state of the respective application for each respective application of the plurality of actively running applications corresponding to a checkpoint of the respective application is dynamically stored either in memory of the client or in memory of a server at a remote location from the client (504). A transfer triggering condition for transferring application state of the actively running applications to another device client (e.g., from first client 102-1 to second client 102-2, FIG. 1) is detected (506). Optionally, client 102-optionally waits for the plurality of actively running applications to enter their respective checkpoints and suspends execution of the plurality of actively running applications (508, 511). Alternatively, in some implementations, upon detecting the triggering condition, first client 102-1 suspends a respective actively running application of the plurality of actively running applications when the respective actively running application reaches a checkpoint of the respective actively running application (509).

The stored application state of the plurality of actively running applications is transmitted to client 102-2 (512). In some embodiments, each of the actively running applications is notified that the application state has been transmitted to the second client device (514).

Referring to FIG. 5B, in some embodiments, detecting the transfer triggering condition (506) includes detecting presence of another client device or system (e.g., second client 102-2) within a predefined proximity of first client 102-1 (308). Furthermore, as described above, in some embodiments, the predefined proximity is the proximity required to successfully establish an NFC channel (also called an NFC connection) between two devices, or to successfully conduct NFC communications (507). In some implementations, detecting the transfer triggering condition includes establishing an NFC channel (310). In some embodiments, the transfer triggering condition includes an instruction by a user (e.g., pressing a button or object on a touch sensitive display) of the first client device or system (526). However, in many implementations, no user action other than bringing the two devices close to each other is required.

Referring to FIG. 5C, in some embodiments, first client 102-1 starts transmitting the stored application state of the plurality of actively running applications only after detecting the suspension of the plurality of active applications (528). Alternatively, in some embodiments, first client 102-1 transmits the stored application state of an application to the second device or system after detecting the suspension of the respective active application without waiting for the suspension of the other still actively running applications (530). In some embodiments (not shown in FIGS. 5A-5C), first client 102-1 transmits the stored application state of the plurality of actively running applications after a predefined number of applications have been suspended.

In some embodiments, to minimize the delay of transferring the application state from first client 102-1 to second client 102-2, the transfer triggering condition comprises detecting the NFC field of the second device without forming a NFC connection. In some embodiments, first client 102-1 establishes a NFC connection with second client 102-2 either after having suspended the plurality of actively running applications, or while in the process of suspending execution of the plurality of actively running applications.

In some implementations, first client 102-1 transmits user authentication information as part of the application state transmitted to second client 102-2 (532).

As described above, in some embodiments, at least a portion of the application state is transmitted to second client 102-2 using near field communication (336). Furthermore, in some implementations, at least another portion of the application state is transmitted using wireless communication other than near field communication, such as Bluetooth communication or WiFi communication (338). In yet other implementations, the application state is entirely transmitted using a near field communication connection between the first client device or system and the second device or system (340).

Method 500 is typically be governed by instructions that are stored in a non-transitory computer readable storage medium in a respective client 102-1 and that are executed by one or more processors of a respective client device or system 102. Each of the operations shown in FIGS. 5A-5C typically corresponds to computer readable instructions which are stored in a computer memory or non-transitory computer readable storage medium in a respective client 102-1 and which are executed by one or more processors of the respective client 102-1. The non-transitory computer readable storage medium includes one or more memory devices of client 102-1, as described above with respect to FIG. 2. The computer readable instructions stored on the non-transitory computer readable storage medium of client 102-1 are typically source code, assembly language code or object code.

Additionally, it should be noted that details of other processes described herein with respect to methods 300, 400 and 600 (e.g., FIGS. 3A-3C, 4A-4C and 6, respectively) are also applicable in an analogous manner to method 500 described above with respect to FIGS. 5A-5C. For example, triggering conditions, and state information transferred may have one or more of the characteristics of the various the methods described herein with reference to methods 300, 400 and 600. For brevity, these details are not repeated here.

Figure 6:
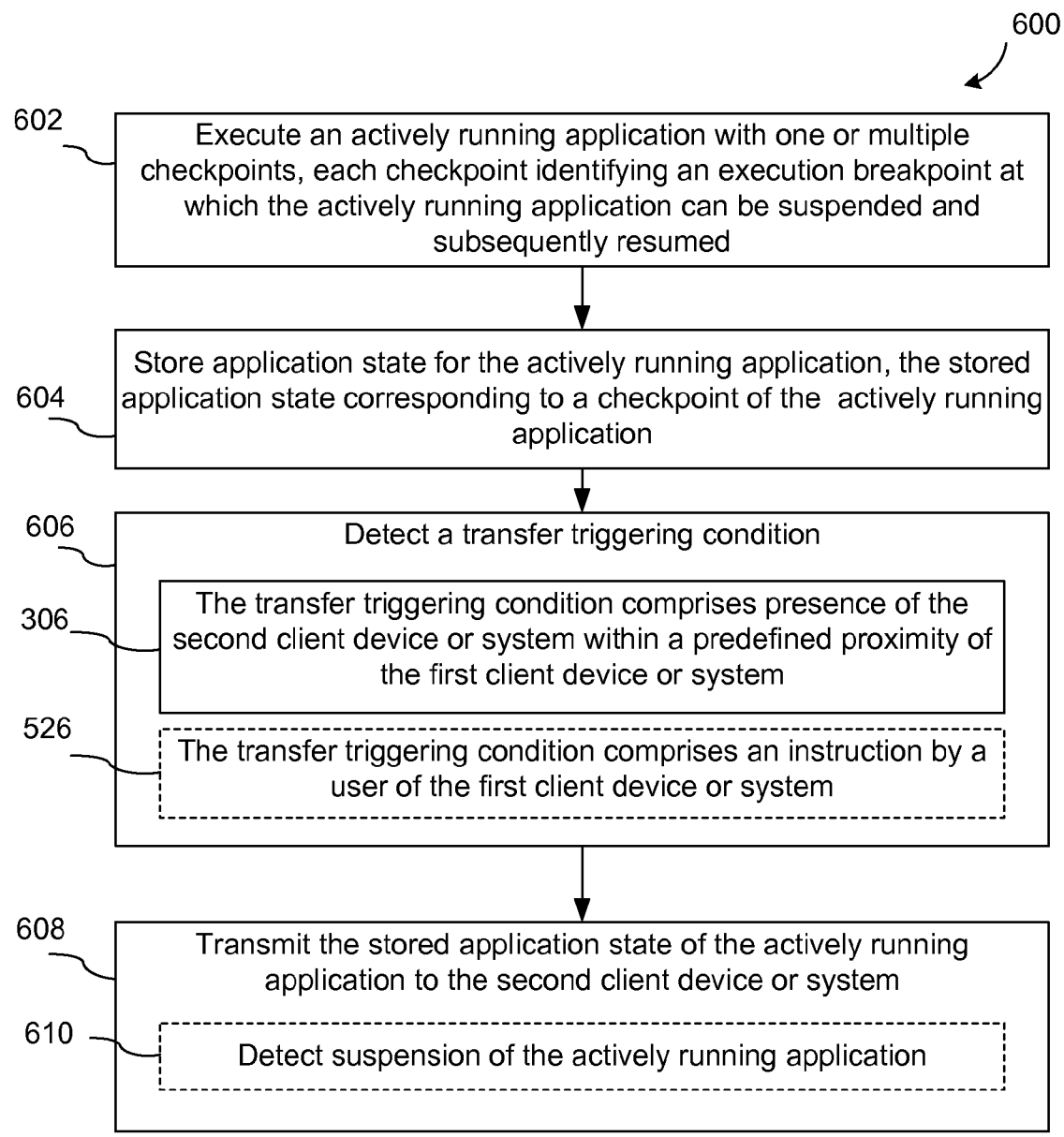
FIG. 6 includes a flow chart illustrating a method of transmitting the application state of an actively running application from a first client device or system to a second client device or system, in accordance with some embodiments.

FIG. 6 includes a flow chart illustrating a method 600 of operation of a client device or system according to some embodiments. Method 600 is performed by a client device or system, such as client device or system 102-1 described above with reference to FIGS. 1 and 2. Client 102-1 executes an actively running application having one or more checkpoints, each checkpoint identifying an execution breakpoint at which the actively running application can be suspended and subsequently resumed (602). The application state of the respective actively running application corresponding to a checkpoint of the respective application is dynamically stored either in memory of the client or in memory of a server at a remote location from the client (604). A transfer triggering condition for transferring application state of the respective application to another device client (e.g., from client 102-1 to client 102-2, FIG. 1) is detected (606). In some embodiments, the transfer triggering condition includes presence of the second client device or system within a predefined proximity of the first client device or system (306, see also above description with reference to FIG. 5B). Furthermore, in some embodiments, the predefined proximity is a predefined proximity for near field communication (308, FIG. 5B, described above with reference to FIG. 5B). In some embodiments, the transfer triggering condition includes an instruction by a user (e.g., pressing a button or object on a touch sensitive display) of the first client device or system (526, described above with reference to FIG. 5B).

Method 600 is typically be governed by instructions that are stored in a non-transitory computer readable storage medium in a respective client 102-1 and that are executed by one or more processors of a respective client device or system 102. Each of the operations shown in FIG. 6 typically corresponds to computer readable instructions which are stored in a computer memory or non-transitory computer readable storage medium in a respective client 102-1 and which are executed by one or more processors of the respective client 102-1. The non-transitory computer readable storage medium includes one or more memory devices of client 102-1, as described above with respect to FIG. 2. The computer readable instructions stored on the non-transitory computer readable storage medium of client 102-1 are typically source code, assembly language code or object code.

Additionally, it should be noted that details of other processes described herein with respect to methods 300, 400 and 500 (e.g., FIGS. 3A-3C, 4A-4C and 5A-5C, respectively) are also applicable in an analogous manner to method 600 described above with respect to FIG. 6. For example, triggering conditions, and state information transferred may have one or more of the characteristics of the various the methods described herein with reference to methods 300, 400 and 500. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of facilitating transitioning use of an application by a user from a first client device or system to a second client device or system, comprising:

at the first client device or system under control of a respective user:
executing a first application;
performing a handoff operation, comprising: when the first client device or system is positioned within a predefined proximity of the second client device or system, transmitting application information, associated with the first application, to the second client device or system;
wherein the first application has a first client device user interface state when the handoff operation is performed;

at the first client device or system, in response to receiving from another client device or system application information associated with a second application executed by the other client device or system:
executing a third application corresponding to the second application with an initial user interface state corresponding to a user interface state of the other client device or system,
wherein executing the third application, in response to receiving the application information associated with the second application, includes transitioning from a system state in which the third application corresponding to the second application is not executing as a foreground application to a system state in which the third application corresponding to the second application is executing as the foreground application.

2. The method of claim 1, wherein the predefined proximity is no greater than four centimeters.

3. The method of claim 1, wherein the second application and third application are both email applications.

4. The method of claim 3, wherein the user interface state of the other client device or system comprises display of a particular message or conversation thread, and the initial user interface state corresponding to the user interface state of the other client device or system comprises display of said particular message or conversation thread.

5. The method of claim 3, wherein the user interface state of the other client device or system comprises display of an unsent draft message, and the initial user interface state corresponding to the user interface state of the other client device or system comprises display of said unsent draft message.

6. The method of claim 3, wherein the user interface state of the other client device or system comprises display of a first list of conversations corresponding to a user-specified search query, and the initial user interface state corresponding to the user interface state of the other client device or system comprises display of a second list of conversations corresponding to the user-specified search query.

7. The method of claim 1, wherein the second client device or system is the other client device or system.

8. A first client device or system, comprising:
one or more communication interfaces, including a near field communication transceiver;
one or more processors; and
memory storing one or more programs for execution by the one or more processors, the one or more programs comprising instructions to:
execute a first application;
perform a handoff operation, comprising: when the first client device or system is positioned within a predefined proximity of a second client device or system, transmitting application information, associated with the first application, to the second client device or system, wherein the first application has a first client device user interface state when the handoff operation is performed;
in response to receiving, from another client device or system, application information associated with a second application executed by the other client device or system:
execute a third application corresponding to the second application with an initial user interface state corresponding to a user interface state of the other client device or system,
wherein executing the third application, in response to receiving the application information associated with the second application, includes transitioning from a system state in which the third application corresponding to the second application is not executing as a foreground application to a system state in which the third application corresponding to the second application is executing as the foreground application.

9. The first client device or system of claim 8, wherein the predefined proximity is no greater than four centimeters.

10. The first client device or system of claim 8, wherein the second application and third application are both email applications.

11. The first client device or system of claim 10, wherein the user interface state of the other client device or system comprises display of a particular message or conversation thread, and the initial user interface state corresponding to the user interface state of the other client device or system comprises display of said particular message or conversation thread.

12. The first client device or system of claim 10, wherein the user interface state of the other client device or system comprises display of an unsent draft message, and the initial user interface state corresponding to the user interface state of the other client device or system comprises display of said unsent draft message.

13. The first client device or system of claim 10, wherein the user interface state of the other client device or system comprises display of a first list of conversations corresponding to a user-specified search query, and the initial user interface state corresponding to the user interface state of the other client device or system comprises display of a second list of conversations corresponding to the user-specified search query.

14. The first client device or system of claim 8, wherein the second client device or system is the other client device or system.

15. A non-transitory computer readable storage medium storing one or more programs for execution by one or more processors of a first client device or system, the one or more programs comprising instructions to:
execute a first application;
perform a handoff operation, comprising: when the first client device or system is positioned within a predefined proximity of a second client device or system, transmitting application information, associated with the first application, to the second client device or system, wherein the first application has a first client device user interface state when the handoff operation is performed;
in response to receiving from another client device or system application information associated with a second application executed by the other client device or system:
execute a third application corresponding to the second application with an initial user interface state corresponding to a user interface state of the other client device or system,
wherein executing the third application, in response to receiving the application information associated with the second application, includes transitioning from a system state in which the third application corresponding to the second application is not executing as a foreground application to a system state in which the third application corresponding to the second application is executing as the foreground application.

16. The non-transitory computer readable storage medium of claim 15, wherein the predefined proximity is no greater than four centimeters.

17. The non-transitory computer readable storage medium of claim 15, wherein the second application and third application are both email applications.

18. The non-transitory computer readable storage medium of claim 17, wherein the user interface state of the other client device or system comprises display of a particular message or conversation thread, and the initial user interface state corresponding to the user interface state of the other client device or system comprises display of said particular message or conversation thread.

19. The non-transitory computer readable storage medium of claim 17, wherein the user interface state of the other client device or system comprises display of an unsent draft message, and the initial user interface state corresponding to the user interface state of the other client device or system comprises display of said unsent draft message.

20. The non-transitory computer readable storage medium of claim 17, wherein the user interface state of the other client device or system comprises display of a first list of conversations corresponding to a user-specified search query, and the initial user interface state corresponding to the user interface state of the other client device or system comprises display of a second list of conversations corresponding to the user-specified search query.

21. The non-transitory computer readable storage medium of claim 15, wherein the second client device or system is the other client device or system.

* * * * *